United States Patent [19]

Kanij et al.

[11] 4,051,060

[45] Sept. 27, 1977

[54] METHOD FOR THE PREPARATION OF CONCENTRATED NITRATE-DEFICIENT SALT SOLUTIONS

[75] Inventors: Johannes B. W. Kanij, Zevenaar; Arend J. Noothout, Oosterbeek; Marie E. A. Hermans, Arnhem; all of Netherlands

[73] Assignee: Reactor Centrum Nederland (Stichting), The Hague, Netherlands

[22] Filed: Nov. 28, 1975

[21] Appl. No.: 636,294

Related U.S. Application Data

[63] Continuation of Ser. No. 358,388, May 8, 1973, now abandoned, which is a continuation-in-part of Ser. No. 106,922, Jan. 15, 1971, now abandoned.

[30] Foreign Application Priority Data

Jan. 16, 1970 Netherlands ............................ 7000674
Jan. 8, 1971 Australia ............................... 24159/71

[52] U.S. Cl. ........ 252/301.1 R; 252/301.15; 423/253
[51] Int. Cl.$^2$ ............................................. C01B 43/00
[58] Field of Search ...... 252/301 R, 301.15; 423/253

[56] References Cited

U.S. PATENT DOCUMENTS

3,401,122  9/1968  Cogliati et al. ............. 252/301.1 R

FOREIGN PATENT DOCUMENTS

411,937  7/1965  Australia

OTHER PUBLICATIONS

Conrad, NSA; Vol. 11, No. 7582, p. 821. Abstracting contract W-7405-eng-1, 1957. MCW-1.

*Primary Examiner*—Richard E. Schafer
*Attorney, Agent or Firm*—Cushman, Darby & Cushman

[57] ABSTRACT

Anion-deficient uranyl nitrate solutions having a uranium concentration of at least 2 molar are prepared by dissolving an oxide of uranium lower than $UO_3$ and at least equal to or higher than $UO_2$, typically $U_3O_8$, in a dilute solution of nitric acid, a uranyl nitrate solution, or both, such that the resulting solution has a nitrate ion concentration to uranium concentration of the order of about 1.5 acording to the disclosed process.

14 Claims, No Drawings

METHOD FOR THE PREPARATION OF CONCENTRATED NITRATE-DEFICIENT SALT SOLUTIONS

Anion-deficient uranyl nitrate solutions having a uranium concentration of at least 2 molar are prepared by dissolving an oxide of uranium lower than $UO_3$ and at least equal to or higher than $UO_2$, typically $U_3O_8$, in a dilute solution of nitric acid, a uranyl nitrate solution, or both, such that the resulting solution has a nitrate ion concentration to uranium concentration of the order of about 1.5 according to the disclosed process.

CROSS REFERENCE TO RELATED APPLICATIONS

This application is a continuation of Ser. No. 358,388, filed May 8, 1973, and now abandoned, which in turn is a continuation-in-part of application Ser. No. 106,922, filed Jan. 15, 1971, also now abandoned.

BACKGROUND OF THE INVENTION

The present invention relates to the preparation of concentrated solutions of anion-deficient salts, and more particularly to the preparation of aqueous solutions of uranyl nitrate having a uranium concentration of about 3 moles and a ratio of the concentrations of nitrate ions to uranium of about 1.5. Anion-deficient salt solutions so produced are useful in the preparation of a mixture of solid oxide and carbide particles, or the preparation of ceramic fuel elements for use as fuels in nuclear homogeneous reactors.

According to prior procedures concentrated anion-deficient salt solutions have been prepared in two manners, first by dissolving uranic oxide, $UO_3$, in a concentrated uranyl nitrate solution. This procedure, however, has the drawback of requiring a type of uranic oxide having a texture or physical configuration that lends itself to easy solubility in the uranyl nitrate solution. Such a uranic oxide is not always readily available and is also reasonably expensive.

Another method constitutes the extration of nitric acid from a stoichiometric, optionally slightly acidic, uranyl nitrate solution: Drawbacks to this process include the limitation that only dilute or very dilute uranyl nitrate solutions can be used when the nitric acid is extracted therefrom. Also specialized equipment is required to accomplish the extraction. Once the nitric acid is removed the solution must then be brought to the desired degree of concentration, such as by evaporation.

Other workers in this field, for example Wilson, have recognized that uranium dioxide or uranous oxide readily dissolves in concentrated nitric acid; see U.S. 3,005,682. Actually the thrust of Wilson's work deals with the solution or attempted solution of plutonium dioxide in nitric acid using cerium ions. Indeed plutonium oxide, as Wilson reports, dissolves only very slowly if at all in nitric acid. Different considerations are present here than those mentioned by Wilson, however, the process of the present invention does not require the use of concentrated nitric acid; on the contrary dilute nitric acid is used.

Aqueous solutions of uranyl nitrate are also described in U.S. 3,212,846 in the name of Burks in which the uranyl nitrate acts as an adherent to hold small particles of uranic oxide together during granulation in the formation of granular uranic oxide.

We have now found a new and improved one-step process that results in a direct preparation of the desired solutions without resort to the indirect procedures of the prior art.

DETAILED DESCRIPTION OF THE INVENTION

Anion-deficient solutions are prepared according to the process of the present invention having the desired concentration and nitrate to uranium ratio in a direct, one-step process by reacting an oxide of uranium of a state of oxidation below that of $UO_3$, with a dilute solution of nitric acid or a uranyl nitrate solution or mixtures of dilute nitric acid and a uranyl nitrate solution. According to our process only a relatively small amount of liquid is required, as compared to prior procedures, thus providing the uranyl nitrate solution available in the concentration desired. The amount of liquid in the solution will vary, of course, depending on the total volume, however at all times the product produced by the described process will have a uranium concentration of at least 2 molar and up to as much as the saturation point of the solution. Typically the concentration will be at least 2 molar.

The concentration of the nitric acid solution employed is generally well below that of concentrated nitric acid and generally within the range of about 1.5 to 2.0 molar, preferably about 1.5 to 2.0 molar.

During the preparation of the uranyl nitrate solution there may also be incorporated other ceramic-producing types of materials to prepare ceramic fuel elements having improved strength and grain control. Suitable materials include water-soluble boron, yttrium, zirconium, the rare earth metals and mixtures of two or more of these materials.

As the source of uranium oxide we prefer to use uranium oxides lower than $UO_3$, such as $UO_2$ and $U_3O_8$, for it is in this oxide form, as well as uranyl nitrate, that uranium is commonly available as the basic material and also the form in which uranium is commonly transported. Other forms of uranium oxide are also employed which may be characterized generally as a uranium oxide lower than $UO_3$ and at least equal to, or higher than, $UO_2$. As these oxides are usually prepared by the oxidation of $UO_2$, a range of oxides is given. Further, the oxide employed may be a mixture of several oxide states, so long as it falls within the range stated above, such a mixture frequently resulting from the preparation of $U_3O_8$ as described below.

The solutions prepared by the process of the presnt invention are characterized as having a uranium concentration of about 3 molar and a ratio of the molar concentration of nitrate ions present to the molar concentration of uranium ions present of about 1.5, expressed hereinafter as $NO_3/U$. According to these parameters, then, the uranium concentration can be *higher* than that of the saturated stoichiometric uranyl nitrate solution.

Ceramic fissile materials are prepared from the solutions of the present invention by mixing the solution with an ammonia-liberating agent and then disbursed in an organic liquid immiscible with water and maintained at a sufficient temperature to liberate the ammonia. This process is well known in the art as are the specific ammonia liberating agents employed. It is also recognized in the art we use, as the starting material, a highly concentrated uranium solution, thus the concentrated solutions of the present invention are of particular practical value in the preparation of ceramic fissile materials.

Although the rate of solution of the uranium oxide selected into the dilute nitric acid is acceptable, there are several expedients that may be used to increase the rate of solution. For instance, the $U_3O_8$ is heated to incandescence in an oxidizing atmosphere, such as air or oxygen, at temperatures between about 600° and 900° C. for a sufficient period of time. At these temperatures most of the volatile and/or combustible impurities incidentally pesent in the $U_3O_8$ are removed and the texture of the material is improved to favor solution. Uranous oxide which is difficulty soluble is easily converted into $U_3O_8$ by the procedure. In this conversion, as well as the other conversion procedures, they are typically a plurality of uranium oxides produced by the calcining treatment, especially when the heating step is not taken to completion. Thus the phrase—at least one uranium oxide lower than $UO_3$ and at least equal to or higher than $UO_2$—has been used in describing and claiming the present invention.

A similar manner very difficulty soluble $UO_2$ is converted to $U_3O_8$ by sintering in air at 700° C. or so. During the sintering process the cubic lattice crystalie structure of the $UO_2$ is changed to the orthorhombic latice structure of $U_3O_8$ and, as the molecular volume of $U_3O_8$ is greater than that of $UO_2$, by virtue of the fact that $UO_2$ has a higher density than $U_3O_8$, the converted particles are completely crumbled; in this manner the surface area of the $UO_2$ is increased to that of $U_3O_8$ so that it then can be readily dissolved in dilute nitric acid.

Preparing $U_3O_8$ in the mannr described above is an especially attractive way of utilizing the waste material ordinarily produced as a by-product of the preparation of ceramic fissile materials. In such a process the waste may consist of either unsintered waste material optionally containing organic filter material, the sintered final composed of $UO_2$ or both. In this manner valuable uranium, heretofor discarded, may be recovered and reused.

According to the process of the present invention the amount of nitric acid needed to dissolve the uranium oxide source is calculated according to the following equations:

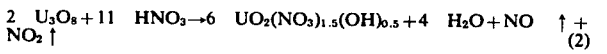

The invention will be further illustrated by the following examples in which all parts and percentages are by weight unless otherwise indicated.

EXAMPLES

Preparation of anion-deficient uranyl nitrate solution.

A solution of uranyl nitrate was prepared by mixing in a beaker natural $UO_2$ powder (42.5 mmole) with nitric acid (127.5 mmole) prepared by adding 11.4854 g. of $UO_2$ with 127.5 mmole of nitric acid diluted in 100 ml. of water. The $UO_2$ was added gradually to the nitric acid solution heated to about 80° C. During the dissolution of the $UO_2$ some loss of the nitric acid occurred due to the open top of the beaker, thus a slight excess of nitric acid was used than would be required by Equation 1. The resulting solution has a $NO_3/U$ ratio of 1.6.

EXAMPLE 2

Processing spherical particles of unsintered $UO_3$.

A quantity of spherical $UO_3$ particles was heated to about 700° C. and maintained at this temperature for about 4 hours, which produced $U_3O_8$ (349.8 g. or 349.8/842 × 1000 = 415 mmole of $U_3O_8$).

The $U_3O_8$ thus obtained was added in portions to a heated nitric acid solution of 160 ml. of concentrated nitric acid (14.4 m.) in 258 ml. of water representing a total volume of 418 ml. and a uranium concentration, after solution, of 3m. The nitric acid/$U_3O_8$ ratio was 2300/415 or about 5.5, and according to Equation 2 the theoretical nitrate to uranium ratio is equal to or greater than 1.5.

Analysis of the solution determined the concentration of uranium to be 3.14 m., the ratio of the concentrations of nitrate ions to uranium of 1.44, and the density of the solution of 1.965 g./cm.$^3$ at 20.6° C.

EXAMPLES 3–4

Example 2 as repeated but using spherical particles of $UO_3$ enriched 20% and 40%, respectively, after first converting to $U_3O_8$. The results obtained as set out in the following table.

| Degree of enrichment | $U_3O_8$ grams | g. mol. $U_3O_8$ | ml. HNO$_3$ 14.4M | mol HNO$_3$ / mol $U_3O_8$ | H$_2$O ml. | Density g./cm.$^3$ 21° C. | [U] Measured | [U] Calculated | [NO$_3$']/[U] |
|---|---|---|---|---|---|---|---|---|---|
| 20% | 770.1 | 0.917 | 350 | 5.50 | 500 | 1.866 | 2.82 | 2.82 | 1.76 |
| 40% | 622.3 | 0.743 | 270 | 5.25 | 300 | 1.904 | 2.95 | 2.97 | 1.58 |

EXAMPLE 5

Conversion of sintered $UO_2$ waste material to soluble $U_3O_8$.

Spherical particles of $UO_2$ (644.1 g.), previously prepared and recovered as waste materials from a sintering operation which was conducted at 1400° C. in a hydrogen atmosphere, were slowly heated in an oxygen-containing atmosphere to about 750° C. and maintained at that temperature for a period of 4 hours. This oxidizing-heating converted the $UO_2$ particles into $U_3O_8$ (662.5 g.) which is readily dissolved into solution according to the procedures of Example 2.

EXAMPLE 6

Dissolving $U_3O_8$ in uranyl nitrate solution.

A quantity of 116 g. of $UO_2(NO_3)_2 \cdot 6$ H$_2$O was dissolved in water (72 ml.) then boiled under reflux with $U_3O_8$ (13.7 g.) for 2.5 hours. A clear solution was obtained having a uranium content of 2.49 molar and a nitrate ion to uranium ratio of 1.62.

Quite apparently several modifications and adjustments to the procedures described above may be made without departing from the essence and scope of this invention.

We claim:

1. A process for the preparation of an aqueous concentrated nitrate-deficient uranyl nitrate solution of a molar nitrate to uranium ratio of about 1.5 or greater, comprising the step of dissolving uranium oxide in a volume of liquid wherein said uranium oxide comprises a mixture having a composition lower than $UO_3$ and at least equal to or higher than $UO_2$ and is dissolved in a volume of liquid selected from the group consisting of:
   (a) a solution of $HNO_3$, wherein the amount of said $HNO_3$ in solution is less than the molar amount of said uranium oxide, so that the uranium concentration in said resulting solution is higher than that of the stoichiometric uranyl nitrate in solution,
   (b) an aqueous solution of uranyl nitrate, and
   (c) a mixtue of (a) and (b), such that the resulting solution has a uranium concentration of at least 2 molar, and the ratio of nitrate ions concentration to uranium concentration is between about 1 and 2 moles, thereby obviating the step of concentrating the solution of nitrate-deficient uranyl nitrate solution.

2. The process according to claim 1 wherein the oxide uranium is selected from the group consisting of uranium dioxide, triuranium octoxide and mixtures thereof.

3. The process according to claim 2 wherein the uranium oxide is triuranium octoxide and is prepared by calcining a uranium-containing compound in an oxidizing atmosphere at a temperature of the order of about 600–900° C., to produce the substantially soluble oxide of uranium triuranium octoxide.

4. A process for the preparation of an aqueous concentrated nitrate-deficient uranyl nitrate solution having a molar nitrate to uranium ratio of about 1.5 or greater up to the saturation point of the solution, consisting essentially of dissolving uranium oxide in a volume of liquid, the uranium oxide having a composition lower than $UO_3$ and at least equal to, or higher than, $UO_2$, the uranium oxide dissolved in a volume of liquid selected from the group consisting of:
   (a) dilute $HNO_3$ solution of about 1 to about 2 molar, the amount of $HNO_3$ being less than the molar amount of the uranium oxide such that in the resulting solution:
      (i) the ratio of nitrate ion concentration to uranium concentration is between about 1 and about 2 molar, and
      (ii) the uranium concentration in the solution is higher tha that of the stoichiometric uranyl nitrate in solution,
   (b) an aqeous solution of uranyl nitrate, and
   (c) a mixture of (a) and (b), such that the resulting solution has:
   (1) a uranium concentration of at least 2 molar, and
   (2) the ratio of the nitrate ion concentration to uranium concentration is between about 1 and 2 molar, thereby obviating the step of concentrating the solution of nitrate-deficient uranyl nitrate solution.

5. The process of claim 4 wherein the ratio of the nitrate ion concentration to uranium concentration is between about 1.5 and 1.76 molar.

6. The process of claim 4 wherein the uranium oxide is $UO_2$, $U_3O_8$ or mixtures thereof.

7. A process for the preparation of an aqueous concentrated nitrate-deficient uranyl nitrate solution having a molar nitrate to uranium ratio of about 1.5 or greater up to the saturation point of the solution, consisting essentially of dissolving uranium oxide in a volume of liquid, the uranium oxide having a composition lower than $UO_3$ and at least equal to or higher than, $UO_2$, the uranium oxide dissolved in a dilute $HNO_3$ solution of about 0.5 to about 2 molar, the amount of $HNO_3$ being less than the molar amount of the uranium oxide, such that in the resulting solution:
   (i) the ratio of nitrate ion concentration to uranium concentration is between about 1 and 2 molar, and
   (ii) the uranium concentration in the solution is higher than that of the stoichiometric nuranyl nitrate in solution, such that the resulting solution has:
   (1) a uranium concentration of at least 2 molar, and
   (2) the ratio of the nitrate ion concentration to uranium concentration is between about 1 and 2 molars, thereby obviating the step of concentrating the solution of nitrate-deficient uranyl nitrate solution.

8. The process of claim 7 wherein the ratio of the nitrate ion concentration to uranium concentration is between about 1.5 and 1.76 molar.

9. The process of claim 7 wherein the uranium oxide is $UO_2$, $U_3O_8$ or mixtures thereof.

10. A process for the preparation of an aqueous concentrated nitrate-deficient uranyl nitrate solution having a molar nitrate to uranium ratio of about 1.5 or greater up to the saturation point of the solution, consisting essentially of dissolving uranium oxide in a volume of liquid, the uranium oxide having a composition lower than $UO_3$ and at least equal to, or higher than, $UO_2$, the uranium oxide dissolved in a volume of an aqueous solution of uranyl nitrate, such that the resulting solution has:
    (1) a uranium concentration of at least 2 molar, and
    (2) the ratio of the nitrate ion concentration to uranium concentration is between about 1 and 2 molar, thereby obviating the step of concentrating the solution of nitrate-deficient uranyl nitrate solution.

11. The process of claim 10 wherein the ratio of the nitrate ion concentration to uranium concentration is between about 1.5 and 1.76 molar.

12. The process of claim 10 wherein the uranium oxide is $UO_2$, $U_3O_8$ or mixtures thereof.

13. A process for the preparation of an aqueous concentrated nitrate-deficient uranyl nitrate solution having a molar nitrate to uranium ratio of about 1.5 or greater up to the saturation point of the solution, comprising the successive steps of: sintering $UO_2$, $U_3O_8$ of their mixture in an oxygen containing atmosphere at a temperature between about 600° C. and about 900° C. to improve the solubility of $U_3O_8$ and convert substantially all of the $UO_2$ to $U_3O_8$ or oxides thereof, followed by; dissolving uranium oxides thus produced in a volume of liquid, selected from the group consisting of:
    (a) a dilute $HNO_3$ solution of about 1 to about 2 molar, the amount of $HNO_3$ being less than the molar amount of the uranium oxide such that in the resulting solution:
       (i) the ratio of nitrate ion concentration to uranium concentration is between about 1 and about 2 molar, and (ii) the uranium concentration in the solution is higher than that of the stoichiometric uranyl nitrate in solution,
(b) an aqueous solution of uranyl nitrate, and
(c) a mixture of (a) and (b),
   such that the resulting solution has:
   (1) a uranium concentration of at least 2 molar, and
   (2) the ratio of the nitrate ion concentration to uranium concentration is between about 1 and 2 molar, thereby obviating the step of concentrating the solution of nitrate-deficient uranyl nitrate solution.

14. The process of claim 13 wherein the ratio of the nitrate ion concentration to uranium concentration is between about 1.5 and 1.76 molar.

* * * * *